United States Patent
Ikenaga et al.

(10) Patent No.: US 10,118,228 B2
(45) Date of Patent: Nov. 6, 2018

(54) CUTTING INSERT

(71) Applicant: SUMITOMO ELECTRIC HARDMETAL CORP., Itami-shi (JP)

(72) Inventors: Shinya Ikenaga, Itami (JP); Yosuke Shimamoto, Itami (JP); Tomoyuki Fukuyama, Sorachi-gun (JP); Junya Okida, Itami (JP); Masanobu Ueda, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 254 days.

(21) Appl. No.: 14/917,229

(22) PCT Filed: Jun. 20, 2014

(86) PCT No.: PCT/JP2014/066412
§ 371 (c)(1),
(2) Date: Mar. 7, 2016

(87) PCT Pub. No.: WO2015/033647
PCT Pub. Date: Mar. 12, 2015

(65) Prior Publication Data
US 2016/0207115 A1     Jul. 21, 2016

(30) Foreign Application Priority Data
Sep. 9, 2013   (JP) .................................. 2013-186153

(51) Int. Cl.
*B23B 27/04* (2006.01)
*B23B 27/22* (2006.01)
(Continued)

(52) U.S. Cl.
CPC ............ *B23B 27/045* (2013.01); *B23B 27/04* (2013.01); *B23B 27/14* (2013.01); *B23B 29/043* (2013.01);
(Continued)

(58) Field of Classification Search
CPC ........ B23B 2200/087; B23B 2200/286; B23B 2220/12; B23B 27/045; B23B 27/043;
(Continued)

(56) References Cited

U.S. PATENT DOCUMENTS 4,778,311 A * 10/1988 Niemi .................. B23B 27/045
407/116
4,969,779 A * 11/1990 Barten ................. B23B 27/045
407/114

(Continued)

FOREIGN PATENT DOCUMENTS

CN          1867416 A     11/2006
CN       201543848 U      8/2010
(Continued)

OTHER PUBLICATIONS

Notification of First Office Action in counterpart Chinese Patent Application No. 201480049596.2, dated Oct. 21, 2016.
(Continued)

*Primary Examiner* — Sara Addisu
(74) *Attorney, Agent, or Firm* — Venable LLP; Michael A. Sartori; Laura G. Remus

(57) ABSTRACT

A cutting insert includes a leading cutting edge having a rake angle in the range of 20° to 35° in a central region in a width direction; and a rake face having a breaker groove formed in the central region in the width direction and land portions formed in both end regions in the width direction. The land portions have a rake angle smaller than the rake angle in the central region in the width direction. The breaker groove includes opposing side faces separated from each other by a distance that decreases with increasing distance from the leading cutting edge and four shoulder portions of the same height that are formed on the opposing side faces at positions above the land portions, two of the shoulder portions being (Continued)

closer to the leading cutting edge and to outer sides in the width direction than the other two shoulder portions are.

2 Claims, 7 Drawing Sheets

(51) Int. Cl.
*B23B 27/14* (2006.01)
*B23B 29/04* (2006.01)

(52) U.S. Cl.
CPC ... *B23B 2200/087* (2013.01); *B23B 2200/286* (2013.01); *B23B 2220/12* (2013.01)

(58) Field of Classification Search
CPC ......... B23B 27/04; B23B 27/14; B23B 27/16; B23B 27/1607; B23B 27/1637
See application file for complete search history.

(56) References Cited

U.S. PATENT DOCUMENTS

| | | | | |
|---|---|---|---|---|
| 5,137,396 | A * | 8/1992 | Durschinger | B23B 27/045 407/116 |
| 5,423,639 | A | 6/1995 | Wiman | |
| 5,511,911 | A * | 4/1996 | Katbi | B23B 27/045 407/114 |
| 5,676,495 | A * | 10/1997 | Katbi | B23B 27/045 407/114 |
| 5,725,334 | A * | 3/1998 | Paya | B23B 27/045 407/104 |
| 6,742,971 | B2 * | 6/2004 | Tong | B23B 27/045 407/113 |
| 6,799,925 | B2 * | 10/2004 | Ejderklint | B23B 27/045 407/114 |
| 7,665,933 | B2 * | 2/2010 | Nagaya | B23B 27/045 407/114 |
| 7,883,300 | B1 | 2/2011 | Simpson, III et al. | |
| 8,770,895 | B2 * | 7/2014 | Inoue | B23B 27/045 407/113 |
| 8,784,014 | B2 * | 7/2014 | Onodera | B23B 27/045 407/114 |
| 9,272,336 | B2 * | 3/2016 | Inoue | B23B 27/045 |
| 9,630,255 | B2 * | 4/2017 | Shimamoto | B23B 27/045 |
| 2001/0014259 | A1 * | 8/2001 | Inayama | B23B 27/045 407/116 |
| 2002/0122700 | A1 * | 9/2002 | Inayama | B23B 27/045 407/117 |
| 2002/0197119 | A1 * | 12/2002 | Kinukawa | B23B 27/045 407/114 |
| 2012/0297941 | A1 * | 11/2012 | Inoue | B23B 27/045 82/1.11 |
| 2013/0183109 | A1 * | 7/2013 | Fujii | B23B 27/045 407/100 |
| 2016/0271703 | A1 * | 9/2016 | Inoue | B23B 27/045 |
| 2017/0157678 | A1 * | 6/2017 | Inoue | B23B 27/04 |

FOREIGN PATENT DOCUMENTS

| | | |
|---|---|---|
| CN | 201572925 U | 9/2010 |
| DE | 36 43 802 A1 | 6/1988 |
| DE | 92 14 563.9 U1 | 10/1992 |
| EP | 2 578 340 A1 | 4/2013 |
| EP | 2 623 236 A1 | 8/2013 |
| JP | S62-53902 U | 4/1987 |
| JP | 10-505012 A | 5/1998 |
| JP | 2002-254216 A | 9/2002 |
| JP | 2009-012118 A | 1/2009 |
| WO | WO-96/08330 A1 | 3/1996 |
| WO | WO-2011/093333 A1 | 8/2011 |
| WO | 2011/142297 A1 | 11/2011 |
| WO | WO-2011/149091 A1 | 12/2011 |

OTHER PUBLICATIONS

Extended European Search Report in European Patent Application No. 14841850.2, dated Jul. 25, 2016.
International Search Report in International Application No. PCT/JP2014/066412, dated Sep. 22, 2014.

* cited by examiner

CUTTING INSERT

TECHNICAL FIELD

This invention relates to a cutting insert for turning, such as cutting off or grooving.

BACKGROUND ART

PTL 1 below describes a known structure of a cutting tool for turning, such as cutting off or grooving.

In the structure described in PTL 1, a recess having a curved groove surface is formed in a rake face in a central region in a width direction, and the recess serves as a breaker for curling chips. The recess has a width that gradually decreases with increasing distance from the cutting edge, so that the chips receive not only a curling force but also a bending force in the width direction.

CITATION LIST

Patent Literature

PTL 1: Japanese Unexamined Patent Application Publication No. 2002-254216

SUMMARY OF INVENTION

Technical Problem

With the structure disclosed in PTL 1, for example, chips are deformed by being pushed into the recess in the central region of the rake face in the width direction and bent in the width direction. The chips bent in the width direction also receive a curling force.

As a result, the chips are deformed into a complex shape and easily break. Thus, the chips are appropriately processed. However, since the chips evacuate along the groove surface of the recess while increasing the amount by which the chips are bent in the width direction, the following problems occur. That is, when conditions are such that the chips are thin and hard to curl as in the case where a stainless steel is processed at a low feed rate, since the breaker operates (functions) over a region that extends to a position distant from the leading cutting edge, there is a problem that the chips are excessively restrained and the cutting force increases.

An object of the present invention is to provide a cutting insert for cutting off or grooving with which the cutting force can be reduced while a high chip-processing performance is maintained.

Solution to Problem

To achieve the above-described object, in this invention, a cutting insert for cutting off or grooving has the following structure.

That is, the cutting insert includes a leading cutting edge having a rake angle in the range of 20° to 35° in a central region in a width direction; and a rake face having a breaker groove formed in the central region in the width direction and land portions formed in both end regions in the width direction. The land portions have a rake angle smaller than the rake angle in the central region in the width direction. The breaker groove includes opposing side faces separated from each other by a distance that decreases with increasing distance from the leading cutting edge and four shoulder portions of the same height that are formed on the opposing side faces at positions above the land portions, two of the shoulder portions being closer to the leading cutting edge and to outer sides in the width direction than the other two shoulder portions are.

Advantageous Effects of Invention

With the cutting insert according to this invention having the above-described structure, the cutting force can be reduced while a high chip-processing performance is maintained.

DESCRIPTION OF EMBODIMENTS

A cutting insert according to an embodiment of this invention will now be described with reference to FIGS. 1 to 8.

A cutting insert 1 illustrated in FIGS. 1 to 4 includes a leading cutting edge 2, a rake face 3 that is connected to the leading cutting edge, and a chip breaker.

Figure 2:
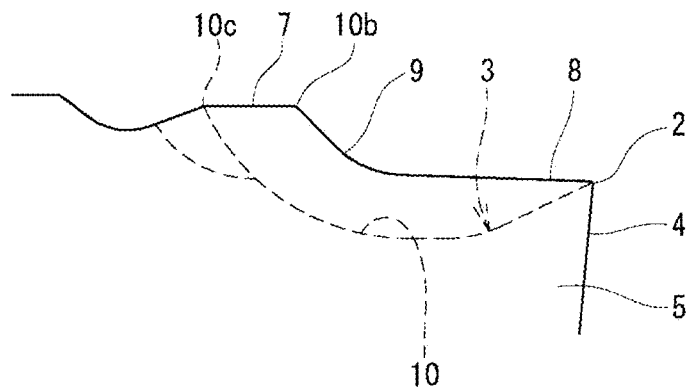
FIG. 2 is a side view of the main part of the cutting insert illustrated in FIG. 1.
Figure 3:
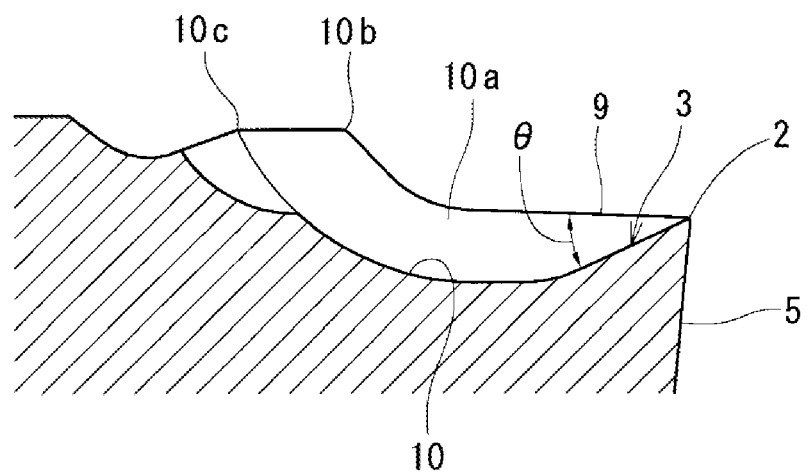
FIG. 3 is a sectional view taken along line III-III in FIG. 1
Figure 4:
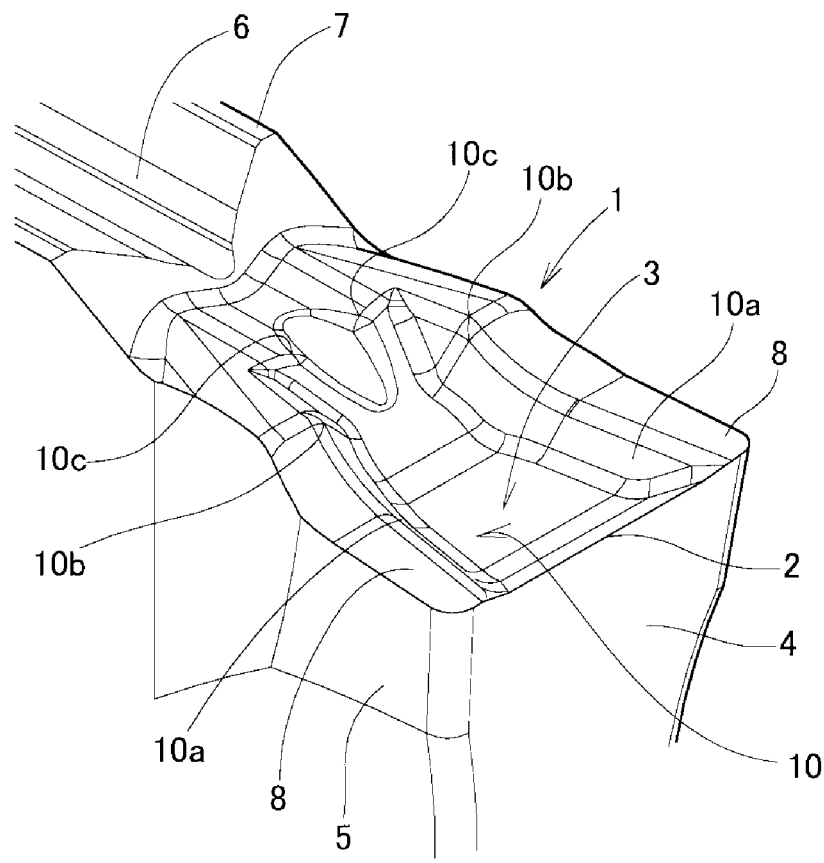
FIG. 4 is a perspective view of the main part of the cutting insert illustrated in FIG. 1.

Reference numeral 4 in FIGS. 2, 3, and 4 denotes a front flank face, and reference numeral 5 in FIGS. 2 and 4 denotes side flank faces. The front flank face 4 and the side flank faces 5 have clearance angles in the range of about 5° to 16°.

Figure 1:
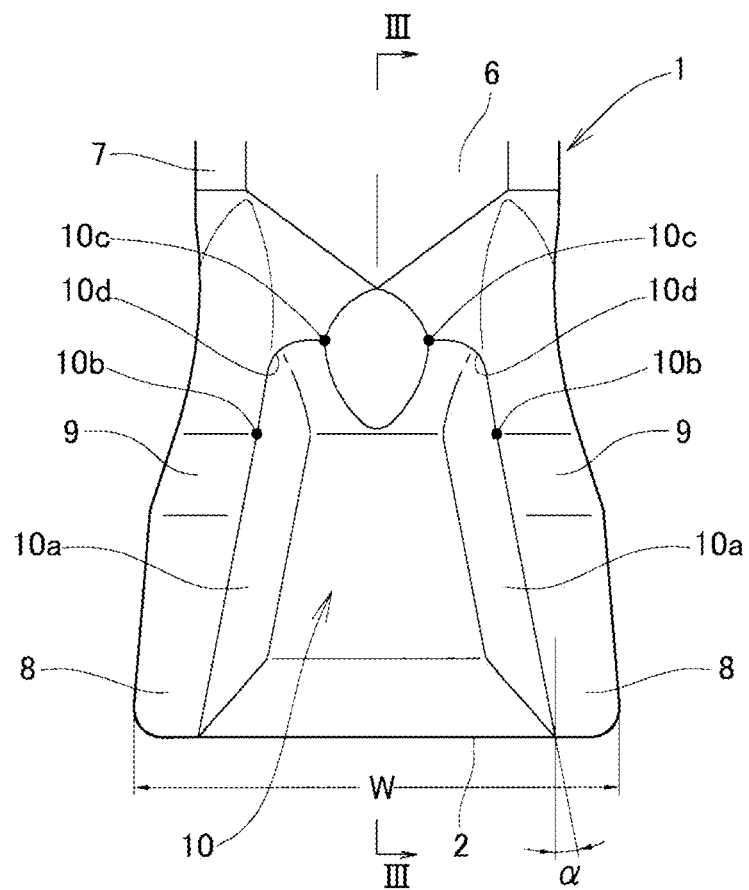
FIG. 1 is a plan view of a main part of an example of a cutting insert according to this invention.

Reference numeral 6 in FIGS. 1 and 4 denotes a clamping V-groove formed in a top face 7. A clamp portion (not shown) of a cutting-tool holder is engaged with the top face having the V-groove 6 and a bottom face (which also has a V-groove or V-shaped projection) of the cutting insert, so that the cutting insert 1 is fixed to the cutting-tool holder. The manner in which the cutting insert 1 is fixed to the cutting-tool holder is not limited to this.

The leading cutting edge 2 is a cutting edge having a leading cutting edge angle of 0°. The leading cutting edge 2 has a positive rake angle θ in a region excluding both end regions (central region in the width direction), as illustrated in FIG. 3. The rake angle θ is in the range 20° to 35°. Such a large rake angle is particularly effective in appropriately processing chips when a tough metal, such as stainless steel, is processed at a low feed rate.

The rake angle is smaller in both end regions of the rake face 3 (regions along the side flank faces) than in the central region, and the end regions serve as land portions (in the illustrated cutting insert, flat lands having a rake angle of 0°) 8 in which importance is given to the strength.

Inclined faces 9 that are curved upward toward the top face 7 are connected to back portions (side opposite the side at which the leading cutting edge is provided is defined as the back side) of the land portions 8.

The height of a region of the rake face 3 having a positive rake angle θ gradually decreases with increasing distance from the leading cutting edge 2, so that a breaker groove 10 is formed between the land portions 8 and 8 at both ends, that is, in a central region of the rake face 3 in the width direction.

The breaker groove 10 includes opposing side faces 10a and 10a that are separated from each other by a distance that decreases with increasing distance from the leading cutting edge 2.

The opposing side faces 10a and 10a obliquely extend upward in opposite directions from the bottom of the breaker groove 10 to positions where they intersect the land portions 8, the inclined faces 9, and the top face 7.

In the illustrated cutting insert 1, an inclination angle α (see FIG. 1) of the opposing side faces 10a with respect to the leading cutting edge 2 is set to 10° in plan view of the insert.

When the inclination angle α is too small, chips cannot be sufficiently squeezed and bent in the width direction. When the inclination angle is too large, the evacuation resistance of the chips is increased and the cutting force cannot be effectively reduced. To balance these two functions, the inclination angle α is preferably in the range 5° to 13°.

The breaker groove 10 of the chip breaker includes four shoulder portions 10b, 10b, 10c, and 10c that are at the same height and that project toward each other on the opposing side faces 10a and 10a at positions above the land portion 8.

Figure 5:
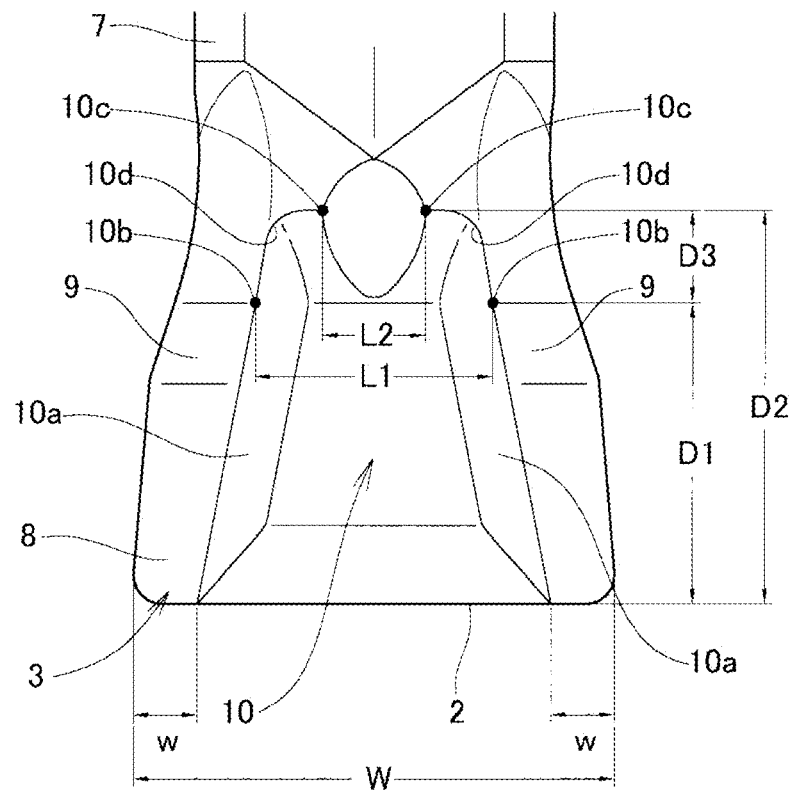
FIG. 5 is a plan view illustrating a dimensional specification of a sample of the cutting insert.

Among the four shoulder portions, two shoulder portions 10b and 10b that are closer to the leading cutting edge 2 are formed at the positions where the land portions 8, the inclined faces 9, and the top face 7 intersect, and the distance L1 therebetween illustrated in FIG. 5 is set to around 50% of an edge width W (also illustrated in FIG. 5).

The remaining two shoulder portions 10c and 10c are formed in a region behind the inclined faces 9 at the positions where inclined faces that extend upward from the bottom of relief portions 10d provided on the breaker groove 10, groove side surfaces in a region where the width of the breaker groove 10 is reduced, and the top face 7 intersect, and the distance L2 therebetween (see FIG. 5) is set to around 20% of the edge width W.

The relief portions 10d are provided to prevent the chips from coming into contact with the groove surface at the locations thereof.

The distance L1 between the shoulder portions 10b and 10b illustrated in FIG. 5 varies depending on the width w of the land portions 8 that is also illustrated in FIG. 5, the inclination angle α of the opposing side faces 10a with respect to the leading cutting edge 2 in plan view of the insert illustrated in FIG. 1, and the distance from the leading cutting edge 2 to the shoulder portions 10b.

In the illustrated cutting insert, the distance L1 between the shoulder portions 10b and 10b is set to around 50% of the edge width W. This value is naturally determined when the dimensions of the cutting insert are set to common dimensions of a cutting insert for cutting off or grooving, the width of the land portions 8 is set to 10% of the edge width W as an appropriate value for ensuring sufficient strength in both end regions of the leading cutting edge 2 even when the rake angle is set to a large value to reduce the resistance, and the inclination angle α of the above-described opposing side faces 10a is set to about 10°.

Depending on the design conductions of the cutting insert, the distance L1 may be about 5% above or below the above-described set value. Therefore, the value is described as being "around 50%".

The distance L2 between the shoulder portions 10c is preferably smaller than the distance L1 between the shoulder portions 10b by about 30% of the edge width. Therefore, the distance L2 is set to around 20% of the edge width W.

This value allows the chips generated when a stainless steel is cut at a low feed rate, such as 0.05 mm/rev, to be sufficiently curled so that the evacuation performance can be improved. This value may also be increased or reduced by about 5%. When the value is further reduced, it is expected that the chips will be excessively restrained and the cutting force will be increased.

With the turning insert 1 having the above-described structure, chips generated during cutting off or grooving are guided into the breaker groove 10 and squeezed so that the chips are bent into a concave shape.

Figure 7:
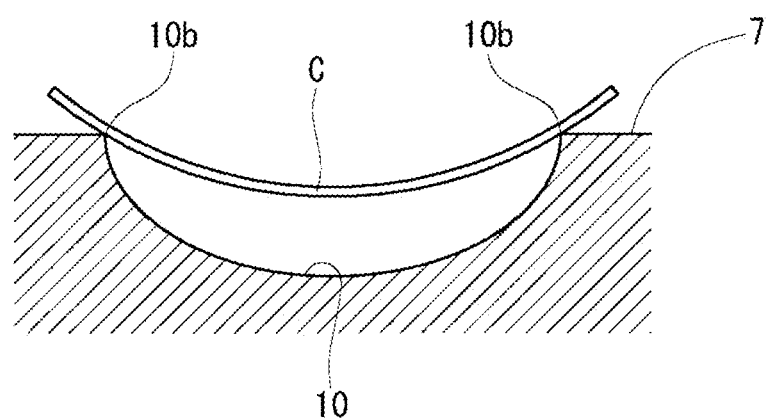
FIG. 7 is a sectional view illustrating the state in which a chip is in contact with two shoulder portions of a chip breaker at a leading-cutting-edge side.

Since the distance between the opposing side faces 10a and 10a of the breaker groove gradually decreases with increasing distance from the leading cutting edge 2, the degree to which the chips are squeezed (bent) increases toward the terminal end (back end) of the breaker groove 10. However, since the chips come into contact with the shoulder portions 10b and are lifted upward during evacuation, as illustrated in FIG. 7, the chip C is raised from the groove surface of the breaker groove 10.

Figure 8:
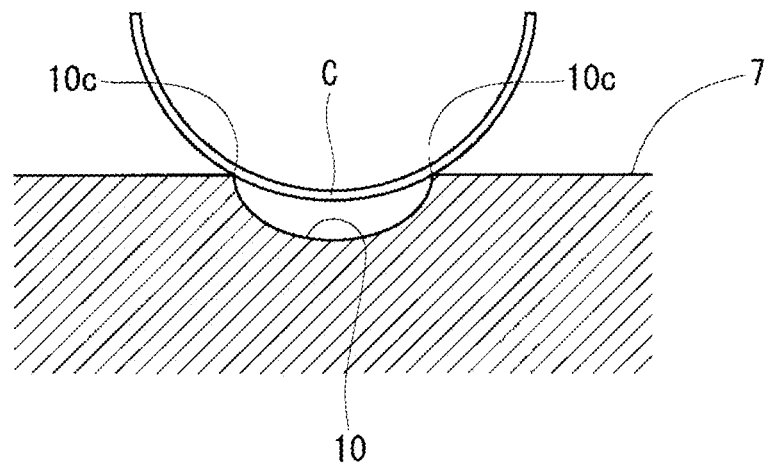
FIG. 8 is a sectional view illustrating the state in which a chip is in contact with the other two shoulder portions of the chip breaker.

Then, the chip further moves toward the back of the breaker groove 10 and comes into contact with the shoulder portions 10c. Therefore, as illustrated in FIG. 8, the chip C is further raised, and the curling force and the bending force in the width direction are increased so that, for example, thin and tough chips generated when a stainless steel is processed at a low feed rate can be appropriately curled. Thus, the chip does not come into contact in a region farther from the leading cutting edge than the shoulder portions are, and is not excessively restrained by the chip breaker. In addition, thick chips are deformed into a complex shape and break into small pieces.

Since the chips come into point contact with the shoulder portions 10b and 10c, the area in which the chips slide along the cutting insert is reduced. Therefore, an increase in cutting force due to an increase in frictional force can be suppressed.

EXAMPLES

Example 1

A sample of a cutting insert having the illustrated shape was manufactured. The dimensional specification of the sample was as follows. That is, referring to FIG. 5, the edge width W was 3.0 mm, the width w of the lands (flat lands) 8 at both ends of the rake face was 0.3 mm, and the distance D1 from the leading cutting edge 2 to the shoulder portions 10b was 2.10 mm (about 70% of the edge width W).

Figure 6:
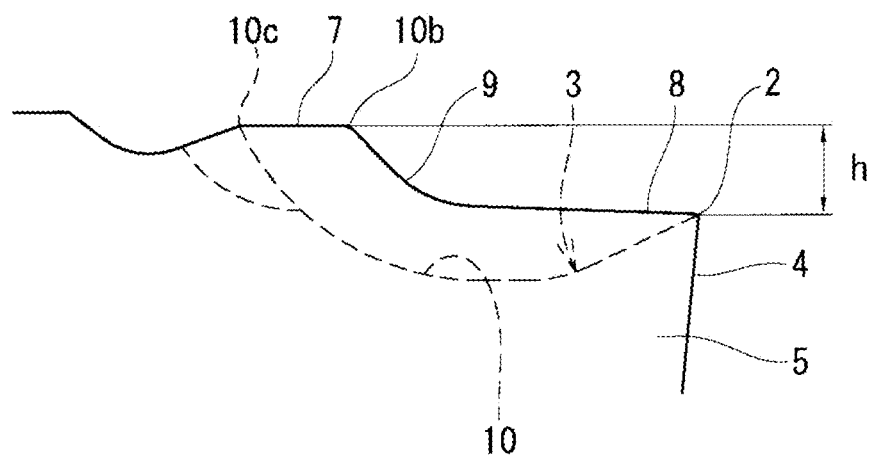
FIG. 6 is a side view illustrating a dimensional specification of the sample of the cutting insert.

The distance D2 from the leading cutting edge 2 to the back shoulder portions 10c was 2.70 mm (about 90% of the edge width W, D3=0.60 mm), the distance L1 between the shoulder portions 10b and 10b was 50% of the edge width W, the distance L2 between the shoulder portions 10c and 10c was 20% of the edge width W, and the height h of the shoulder portions 10b and 10c from the leading cutting edge 2 illustrated in FIG. 6 was 0.30 mm.

The rake angle θ of the leading cutting edge 2 in a region excluding both end regions illustrated in FIG. 6 was 30°, the rake angle in the regions where the lands 8 were formed was 0°, and the inclination angle α of the opposing side faces with respect to the leading cutting edge in plan view of the insert was 10°.

This sample and six types of commercially available cutting inserts for cutting off or grooving manufactured by other companies were used under the following conditions, and were compared in terms of cutting force and generated chips.

Figure 10:
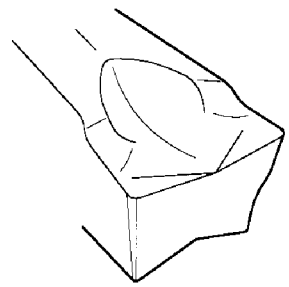
FIG. 10 is a perspective view illustrating the outline of chip breakers of commercially available cutting inserts A and B used in the evaluation examination.
Figure 14:
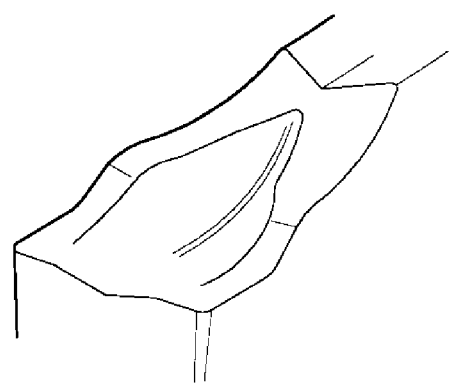
FIG. 14 is a perspective view illustrating the outline of a chip breaker of a commercially available cutting insert F used in the evaluation examination.

FIGS. 10 and 14 illustrate the outlines of the commercially available cutting inserts. A commercially available cutting insert B has a chip breaker having substantially the same shape as that of a commercially available cutting insert A illustrated in FIG. 10.

Figure 11:
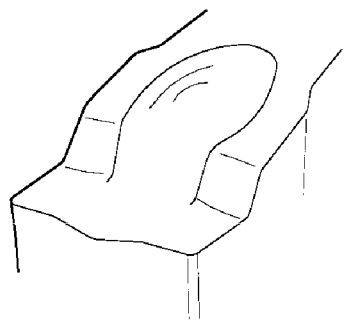
FIG. 11 is a perspective view illustrating the outline of a chip breaker of a commercially available cutting insert C used in the evaluation examination.
Figure 12:
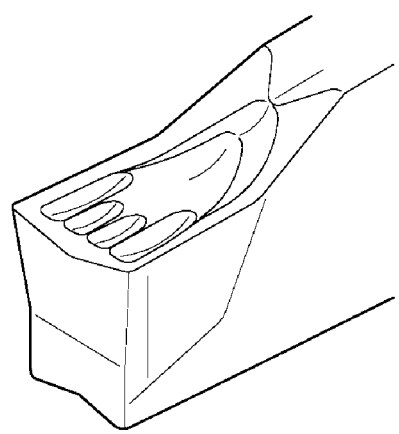
FIG. 12 is a perspective view illustrating the outline of a chip breaker of a commercially available cutting insert D used in the evaluation examination.
Figure 13:
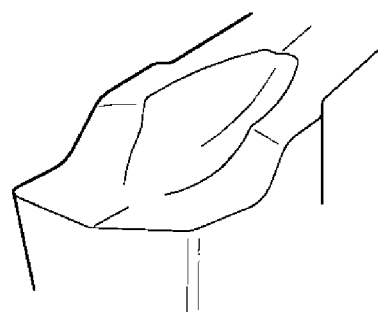
FIG. 13 is a perspective view illustrating the outline of a chip breaker of a commercially available cutting insert E used in the evaluation examination.

FIG. 11 illustrates the shape of a chip breaker of a commercially available cutting insert C, FIG. 12 illustrates the shape of a chip breaker of a commercially available cutting insert D, FIG. 13 illustrates the shape of a chip breaker of a commercially available cutting insert E, and FIG. 14 illustrates the shape of a chip breaker of a commercially available cutting insert F. The above-mentioned commercially available cutting inserts A to F are not provided with the four shoulder portions.

Table 1 shows the results of the evaluation examination (principal force and thrust force of each cutting insert). In the evaluation examination, the principal force and thrust force were measured by using a tool dynamometer.

Cutting Conditions Workpiece: SUS316 (round bar with outer diameter of φ30 mm)
Process: Cutting off and Grooving
Cutting Speed Vc=80 m/min
Feed: f=0.05 mm/rev, f=0.10 mm/rev, and f=0.15 mm/rev
Process Mode: Wet

TABLE 1

|  | f = 0.05 mm/rev | | f = 0.10 mm/rev | | f = 0.15 mm/rev | |
| --- | --- | --- | --- | --- | --- | --- |
|  | Principal Force | Thrust Force | Principal Force | Thrust Force | Principal Force | Thrust Force |
| Sample | 446N | 297N | 772N | 455N | 1096N | 603N |
| Commercially Available Cutting Insert A | 486N | 362N | 814N | 505N | 1105N | 594N |
| Commercially Available Cutting Insert B | 467N | 336N | 806N | 509N | 1133N | 655N |
| Commercially Available Cutting Insert C | 453N | 334N | 780N | 443N |  |  |
| Commercially Available Cutting Insert D | 480N | 350N | 820N | 517N | 1137N | 647N |
| Commercially Available Cutting Insert E | 471N | 345N | 763N | 465N | 1075N | 572N |
| Commercially Available Cutting Insert F | 485N | 355N | 783N | 466N | 1078N | 559N |

Figure 9A:
FIG. 9A illustrates chips formed by the sample in an evaluation examination when feed f=0.05 mm/rev.
Figure 9B:
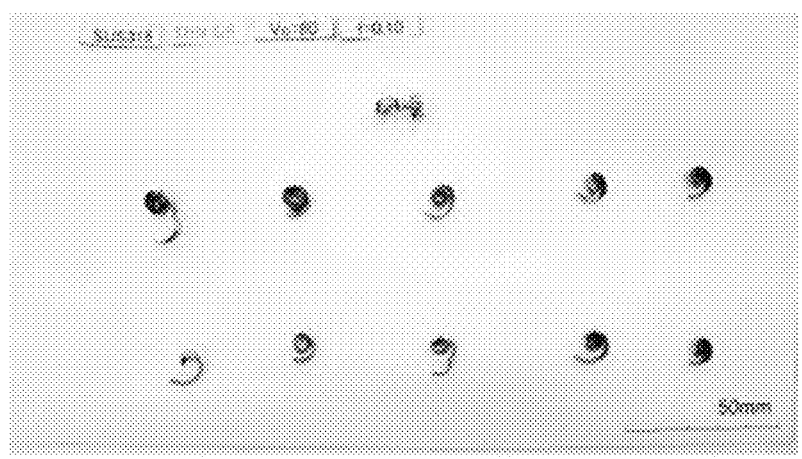
FIG. 9B illustrates chips formed by the sample in the evaluation examination when feed f=0.10 mm/rev.
Figure 9C:
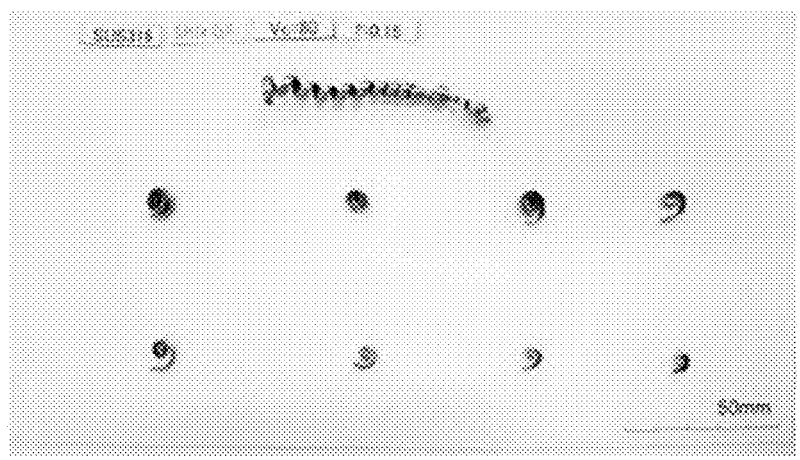
FIG. 9C illustrates chips formed by the sample in the evaluation examination when feed f=0.15 mm/rev.

FIGS. 9A to 9C show chips generated by the sample. FIG. 9A shows chips generated during a process in which feed f=0.05 mm/rev, FIG. 9B shows chips generated during a process in which feed f=0.10 mm/rev, and FIG. 9C shows chips generated during a process in which feed f=0.15 mm/rev.

With regard to chips generated by the commercially available cutting inserts, when feed f=0.05 mm/rev, chips generated by five commercially available cutting inserts other than the commercially available cutting insert D did not break and were irregularly curled into shapes such that the chips easily get tangled with the tools and the processed surfaces may be damaged.

With regard to chips generated by the sample, some regularly curled chips that did not break were generated in the early stage of the process. After that, the chips broke into small pieces (see FIG. 9A).

With regard to chips generated by the commercially available cutting insert D, some chips that did not break and had a curl diameter greater than that of the chips formed by the sample were generated in the early stage of the process, and after that the chips broke into small pieces. However, the pieces into which the chips broke were spring-shaped and larger than those generated by the sample.

During cutting performed at feed f=0.10 mm/rev, chips generated by the commercially available cutting inserts D, E, and F did not break and extended in the early stage of the process. In contrast, the chips generated by the sample broke into small pieces from the early stage of the process (see FIG. 9B). The pieces into which the chips broke were smaller than those generated by any of the commercially available cutting inserts.

During cutting performed at feed f=0.15 mm/rev, chips that did not break and curled about a dozen turns were generated by the sample in the early stage of the process. However, after that, the chips broke into small pieces that were about the same size as those generated by the commercially available cutting inserts (see FIG. 9C).

Example 2

To study the influence of the inclination angle α, cutting inserts having the shapes described in Table 2 were manufactured. Other dimensions were the same as those of the cutting insert used in Example 1.

TABLE 2

|  | α | L1 | L2 |
|---|---|---|---|
| Sample I | 0° | 80% of W | 50% of W |
| Sample II | 5° | 55% of W | 25% of W |
| Sample III | 10° | 50% of W | 20% of W |
| Sample IV | 13° | 45% of W | 15% of W |
| Sample V | 15° | 40% of W | 10% of W |

Table 3 shows the results of the evaluation examination (principal force and thrust force of each cutting insert). In the evaluation examination, the principal force and thrust force were measured by using a tool dynamometer. The conditions of the evaluation examination were as follows.
Cutting Conditions Workpiece: SUS316 (round bar with outer diameter of ϕ30 mm)
   Process: Cutting off and Grooving
   Cutting Speed Vc=70 m/min
   Feed: f=0.05 mm/rev, f=0.10 mm/rev, and f=0.15 mm/rev
   Process Mode: Wet

TABLE 3

|  | Cutting Force | | |
|---|---|---|---|
|  | f = 0.05 mm/rev | f = 0.10 mm/rev | f = 0.15 mm/rev |
| Sample I | Principal Force: 427N<br>Thrust Force: 250N | Principal Force: 734N<br>Thrust Force: 431N | Principal Force: 1068N<br>Thrust Force: 551N |
| Sample II | Principal Force: 448N<br>Thrust Force: 287N | Principal Force: 760N<br>Thrust Force: 456N | Principal Force: 1105N<br>Thrust Force: 587N |
| Sample III | Principal Force: 445N<br>Thrust Force: 300N | Principal Force: 775N<br>Thrust Force: 452N | Principal Force: 1090N<br>Thrust Force: 609N |
| Sample IV | Principal Force: 467N<br>Thrust Force: 310N | Principal Force: 782N<br>Thrust Force: 470N | Principal Force: 1146N<br>Thrust Force: 645N |
| Sample V | Principal Force: 479N<br>Thrust Force: 342N | Principal Force: 816N<br>Thrust Force: 484N | Principal Force: 1224N<br>Thrust Force: 702N |

With regard to sample I, when feed f=0.05 mm/rev, chips did not break and extended in the early stage of the process. However, when feed f=0.15 mm/rev, such chips were not generated and most of the chips had a spring shape with a curl diameter of about 10 mm.

With regard to samples II, III, IV, and V, no chips that did not break and extended were generated in any condition, and most of the chips had a spring shape with a small curl diameter.

In Example E of the invention, when feed f=0.15 mm/rev, chips that moved beyond the breaker were generated, and many long chips whose color had changed due to a temperature increase were observed.

As is clear from the results of the evaluation examination, with the cutting insert according to this invention, chips can be appropriately processed even when a tough metal, such as stainless steel, is processed at a low feed rate. In addition, the cutting force is smaller in a wide range of feeding conditions than that in the case where a cutting insert according to the related art is used.

The presently disclosed embodiments are illustrative in all points and should not be considered as limiting. The scope of the present invention is not defined by the above description but rather by the scope of the claims and it is intended that equivalents to the scope of the claims and all modifications within the scope of the claims be included within the scope of the present invention.

REFERENCE SIGNS LIST

1 cutting insert
2 leading cutting edge
3 rake face
4 front flank face
5 side flank face
6 V-groove
7 top face
8 land portion
9 inclined face
10 breaker groove
10a opposing side face
10b, 10c shoulder portion
10d relief portion
θ rake angle
α inclination angle of opposing side faces
C chips
W edge width
L1 distance between two shoulder portions of chip breaker at the leading-cutting-edge side
L2 distance between the other two shoulder portions of chip breaker
D1 distance from leading cutting edge to shoulder portions at the leading-cutting-edge side
D1 distance from leading cutting edge to shoulder portions at the leading-cutting-edge side
D2 distance from leading cutting edge to back shoulder portions
D3 difference between D2 and D1
w width of flat lands
h height of shoulder portions of chip breaker from leading cutting edge

The invention claimed is:

1. A cutting insert for cutting off or grooving, comprising:
a leading cutting edge having a rake angle in the range of 20° to 35° in a central region of the cutting insert in a width direction; and
a rake face having a breaker groove formed in the central region and land portions, the land portions being formed with the breaker groove therebetween in the width direction,
wherein the land portions have a rake angle smaller than the rake angle in the central region of the cutting insert in the width direction, and
wherein the breaker groove includes opposing side faces separated from each other by a distance that decreases with increasing distance from the leading cutting edge and four shoulder portions of the same height that are formed on the opposing side faces at positions above the land portions, two of the shoulder portions being closer to the leading cutting edge and to outer sides in the width direction than the other two shoulder portions are.

2. The cutting insert according to claim 1, wherein, in plan view of the insert, an inclination angle of the opposing side faces with respect to the leading cutting edge is in the range 5° to 13°, a distance between the two shoulder portions that are closer to the leading cutting edge is in the range 45% to 55% of an edge width, and a distance between the remaining two shoulder portions is in the range 15% to 25% of the edge width.

* * * * *